March 31, 1964     D. L. TOTHERO     3,127,531
MOTOR PROTECTION ARRANGEMENT
Filed Nov. 10, 1961
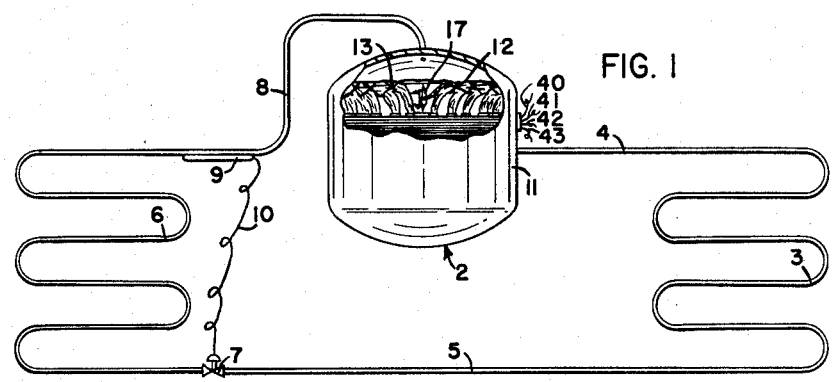
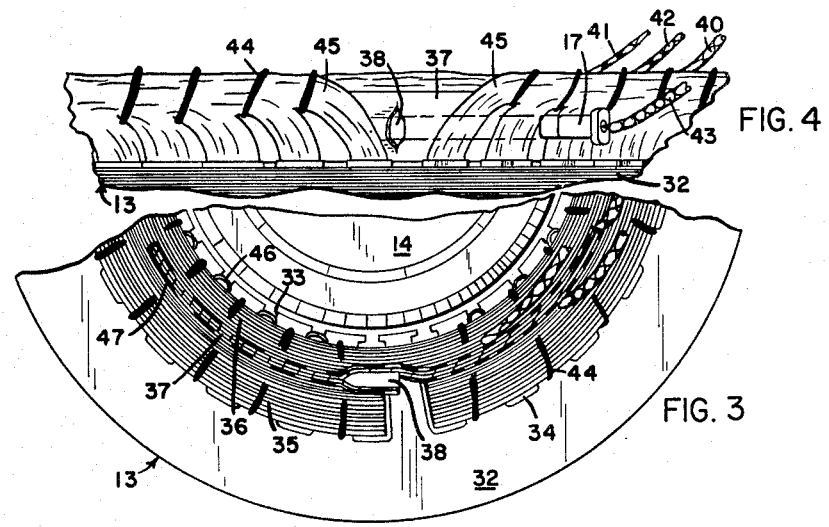
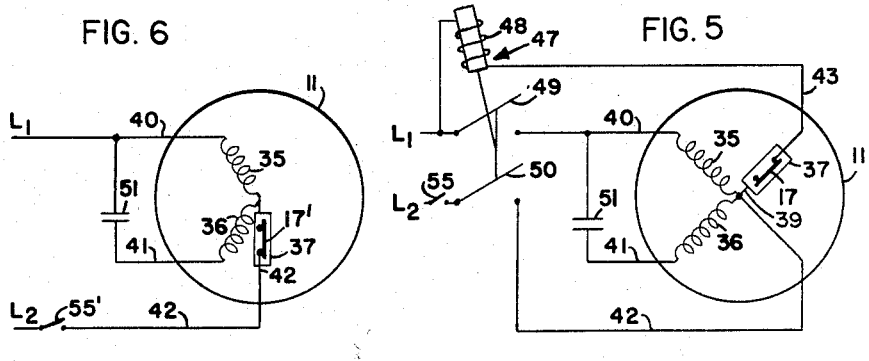
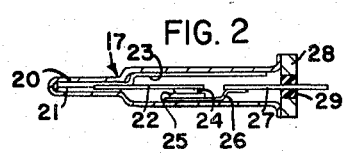
*INVENTOR.*
DWIGHT L. TOTHERO
BY *Seymour Rothstein*
ATTORNEY.

__

United States Patent Office 3,127,531
Patented Mar. 31, 1964

3,127,531
MOTOR PROTECTION ARRANGEMENT
Dwight L. Tothero, North Syracuse, N.Y., assignor to Carrier Corporation, Syracuse, N.Y., a corporation of Delaware
Filed Nov. 10, 1961, Ser. No. 151,563
3 Claims. (Cl. 310—68)

This invention relates to a refrigeration system having a compressor driven by an alternating-current motor and more particularly, to a refrigeration system including a hermetic compressor driven by an electric motor having improved current-temperature responsive protector means.

The preferred protector for use in a motor within a hermetic refrigerant compressor is one that would limit the winding temperature to a maximum selected value at all conditions of voltage, ambient, and load. The protector must prevent the motor winding from exceeding a specified maximum winding temperature. It must also keep the motor running as long as it is safe for it to operate and then take it off the line only when the windings are in danger so as to avoid nuisance tripouts. Such protector, which takes the motor off the line should either the temperature or current become excessive, is sometimes called an "inherent protector."

To accomplish these desired results the protector must be placed as close as possible to the windings of the compressor motor. In the past the protector has been secured to the exterior of the compressor casing and thus has had undesirably slow thermal response characteristics. It has been proposed that a sealed protector be affixed to the interior of the compressor casing to improve the thermal response characteristics. Though some improvement was noted overmounting the protector on the exterior of the compressor casing, further improvement was desired.

It was recently proposed that the protector be placed in or on the motor windings.

In practice, many difficulties have been encountered in physically placing the protector in the motor windings. Some protectors secured in the end turns of the windings have been physically damaged when the end turns are formed or pressed during fabrication of the stator of the motor. In use, the protector would not function properly, causing the motor to burn out, and ultimately resulting in replacement of both the protector and the motor.

When the protector was placed in the windings prior to varnishing, the baking of the stator to dry the varnish insulating the windings sometimes caused damage to the protector. Again, in use this damage to the protector resulted in motor burnout and necessitated replacement of the compressor motor. When it is remembered that the motor is assembled within a hermetically sealed refrigerant compressor, in a preferred application of the present invention, it is evident that the cost of replacement of the motor is indeed high and such replacement must be minimized or obviated.

Heretofore, protectors having two leads or terminals extending therefrom have been commonly used. Such protectors complicate compressor manufacture and sometimes necessitate the provision of a second terminal opening in the compressor casing, one opening for the motor leads and a second opening for the protector leads.

An object of this invention is to provide a refrigeration system including a hermetic compressor with an electric motor having inherent protection whereby the deficiencies and disadvantages of prior arrangements are obviated.

Another object of the present invention is to provide a refrigeration system including a hermetic refrigerant compressor with an electric motor having a readily replaceable inherent protector therein from which only a single lead extends.

Still another object of this invention is to provide a hermetic refrigerant compressor with an electric motor having improved current-temperature responsive protector means.

Yet another object of the present invention is to provide a hermetic refrigerant compressor with improved means for mounting an internal overload protector in the windings of the electric motor in the compressor.

A further object of the present invention is to provide an improved method of making an electric motor having an inherent protector so as to obviate damage to the protector during fabrication of the electric motor. These and other objects of the invention will be more readily perceived from the following description.

This invention relates to a refrigeration system comprising a hermetic compressor, condenser, expansion means and evaporator, an electric motor in the compressor adapted to be connected to a source of power for driving the compressor, the electric motor having a main winding and an auxiliary winding, and means for protecting the electric motor from adverse conditions of temperature or current, the protecting means comprising a heat conductive strap disposed in the windings and electrically connected to the windings and a thermostat having a casing detachably secured to the heat conductive strap and being in electrically conductive relationship thereto, the thermostat having a single terminal extending therefrom connected to the source of power.

This invention further relates to an electric motor for use in a hermetic refrigerant compressor having a sealed casing, the motor having a stator and a rotor inductively related thereto, the stator comprising a main winding and an auxiliary winding, and means for protecting the electric motor against excessive temperature or current comprising a conductive strap disposed in heat exchange relationship with the windings and electrically connected to the windings, the conductive strap having holding means, and a motor protector comprising an electrically conductive casing retained by said holding means, a normally-closed bimetallic switch, and a single lead adapted to be connected to a source of power, the motor protector being detachably connected to the conductive strap so that it can be removed from the conductive strap for replacement without interrupting the windings.

The attached drawing illustrates a preferred embodiment of the invention in which;

FIGURE 1 is a diagrammatic view of a refrigeration system employing the present invention, illustrating the compressor casing partially broken away so as to show the electric motor and protector therein;

FIGURE 2 is a longitudinal view of the protector shown in FIGURE 1, with a portion of the casing broken away;

FIGURE 3 is a fragmentary top view of the electric motor of FIGURE 1 on an enlarged scale, illustrating a presently preferred manner of connecting the protector in the stator of the electric motor;

FIGURE 4 is a fragmentary side view of the electric motor of FIGURE 1 on an enlarged scale, illustrating a presently preferred manner of connecting the protector to the stator of the electric motor;

FIGURE 5 is a schematic wiring diagram of an electric control system employing the protection means of the present invention; and FIGURE 6 is a schematic wiring diagram of a modified electric control system employing the protection means of the present invention.

Referring to FIGURE 1 of the drawing, there is shown a refrigeration system employing the present invention.

The hermetically enclosed compressor 2 is connected to a condenser 3 by discharge line 4. Condenser 3 is connected to evaporator 6 by liquid line 5. Disposed in line 5 is an expansion means preferably, thermal expansion valve 7. It will be apparent that a capillary tube or other expansion means can be used in place of valve 7. The expansion means meters the flow of refrigerant from the condenser to the evaporator. Evaporator 6 is connected to compressor 2 by suction line 8. Thermal expansion valve 7 may be operated in response to the temperature of the suction gas leaving evaporator 6 sensed by bulb 9 mounted adjacent suction line 8 and connected to the expansion valve by means of capillary line 10.

As can be seen in FIGURE 1, casing or shell 11 of compressor 2 encases both motor 12 and the compression mechanism (not shown). The compression mechanism does not form part of the present invention and reference may be made to Gerteis application No. 687,977, filed October 3, 1957, for a preferred type of compression mechanism, now Patent No. 3,008,629.

Motor 12 comprises stator 13 and a rotor inductively related thereto. Mounted within the stator is a sealed protector 17. The protector is adapted to sense the temperature of the motor windings and is also electrically connected to sense any excessive current passing from a power source to the motor.

In FIGURE 2 there is shown a longitudinal view of a protector that may be used with the present invention, with a portion of the housing broken away. Protector 17 comprises a housing or casing 20 of heat conductive material. The casing is also electrically conductive for a reason to be made clearer hereafter. Cantilevered within the crimped end 21 of casing 20 is bimetal 22. Bimetal 22 is affixed to support 23 which is crimped in place within casing 20. Secured to the free end of bimetal 22 is contact 24. Contact 24 is normally in engagement with contact 25 which is secured to support member 26. The support member is affixed to terminal 27, which extends through cover 28 sealing the end of the protector. It will be noted that only one terminal extends from protector 17 and that the casing thereof is electrically "hot." Insulation 29 may be provided between the hole in the cover and the terminal. Thus the interior of protector 17 is sealed from the refrigerant environment within the compressor. It will be apparent that in operation upon the sensing of excessive heat in the windings or excessive current, the free end of bimetal 22 will warp to separate contacts 24 and 25 and thus open the circuit to motor 12, terminating operation of compressor 2.

Referring now to FIGURES 3 and 4 there are shown fragmentary views of motor 12, illustrating the manner of securing the protector mechanism in the stator. In FIGURE 3, there is shown a top view of motor 12 comprising stator 13 and rotor 14. By one method of manufacture the stator is made from a plurality of laminations 32, punched from annealed non-aging electrical sheet steel. The laminations have a plurality of slots 33 therein. These laminations are assembled on a mandrel which aligns the slots. Then the laminations are compressed hydraulically and fastened together as, for example, by welding.

Slot insulator 34 which may be formed from rag paper or from a suitable plastic insulating material as, for example, a polyethylene terephthalate resin are fitted into slots 33 of stator 13. The stator windings which comprise a main winding 35 and an auxiliary winding 36 are generally formed from a plurality of mechanically wound loops 45 inserted into slots 33, and retained therein by fiber wedges 46.

As seen in FIGURE 3, heat conducting strap 37 preferably made from copper, may be inserted in the windings between main winding 35 and auxiliary winding 36. The strap is suitably insulated from the windings as, for example, by a film 47 of polyethylene terephthalate resin.

Then the end turns of the windings may be tied by means of lacings 44. This will be done in such a fashion that the pocket 38 formed in heat conducting strap 37 will be accessible to receive the thermostat or protector 17.

The windings of the motor may then be electrically connected to one another and lead 39 extending from strap 37 may be connected to the windings. It will be noted in FIGURE 4 that four leads extend from the stator; lead 40 extending from the main winding, lead 41 extending from auxiliary or start winding, common lead 42 and lead 43 extending from terminal 27 of protector 17.

A plug having the form of protector 17 should be placed in pocket 38 to maintain the shape of the pocket during the end turn forming operation and to prevent insulating varnish from entering the pocket during the subsequent varnishing operation. If varnish were permitted to enter the pocket, the casing 20 of protector 17 might be insulated from strap 37 and the protector would not function properly.

Stator 13 comprising windings 35 and 36 and laminations 32 is placed in a press and the end turns are formed to the desired configuration. The stator may be cured by baking and immersing it while still warm, in a heavy insulating varnish bath. The heated stator in the cooler varnish creates a partial vacuum, which assists complete impregnation of the windings. The varnished stator is again baked to dry the varnish, then the plug may be removed and protector 17 may be inserted into the pocket 38 of strap 37.

Referring now to FIGURE 5, there is seen a schematic wiring diagram of the preferred form of the present invention. Leads L1 and L2 are connected to a suitable source of electric current as, for example, a 220-volt power source. Control switch 55 which may be a thermostat switch is provided in lead L2. Main or run winding 35 is connected in series across the leads L1 and L2. Auxiliary or start winding 36 is in parallel with run winding 35. It is noted that protector 17 is electrically connected to member 37 which is in series with coil 48 of relay 47. When coil 48 is energized, contacts 49 and 50 are closed and the motor 12 will be operative. If the protector opens in response to either excessive temperature in the motor windings or a current overload, coil 48 is deenergized and contacts 49 and 50 open, deenergizing the motor. Capacitor 51 is electrically connected outside of the compressor casing 11. As is recognized by those having skill in the art, the motor shown is of the permanent split-capacitor type. It will be apparent that other types of single-phase induction motors may be used, as for example, a capacitor-start motor. In FIGURE 5, the protector is wired for pilot-duty application and functions under low current conditions to operate coil 48 of relay 47.

In FIGURE 6, there is shown a modified electrical wiring diagram of an across-the-line type protector. Control switch 55' is connected in lead L2. Heavy-duty thermostat or protector 17', which is capable of withstanding full line current, is inserted into member 37 which is connected in common line 42. The functioning of protector 17' is no different from the functioning of protector 17 shown in FIGURE 5. In this arrangement, only three electrical connections extend from the compressor casing.

It can be seen that by the present invention, there has been provided inherent protection for a motor used in a refrigerant compressor wherein the danger of damage to the protector during manufacture of the motor is minimized. The protector is not secured to the motor until after the end turns have been formed and the stator has been baked, subsequent to varnishing.

The use of a protector having an electrically "hot" casing and only a single terminal is advantageous in a hermetic refrigerant compressor application, in that the thermostat lead and motor leads may extend through a single terminal connection from the compressor casing. In previous constructions it was sometimes necessary to employ two terminals from the compressor casing. Consequently, sealing of the compressor casing was made more complex and the cost of fabricating the refrigerant compressor was increased.

If the protector of the present invention requires replacement, the compressor casing can be opened and the protector can be readily removed by sliding same from the pocket in the heat conductive strap and disconnecting the protector from the single lead connected thereto. The new protector can be slid into the pocket and electrically connected to the single lead extending from the casing. Then the halves of the compressor casing can again be welded to form the hermetic shell.

The protector is in intimate heat exchange relationship with the motor windings and thus quickly responds to limit motor-winding temperature to a narrow temperature range over widely varying operating conditions. In addition, the protector responds quickly to increase in line current so as to prevent damage to the windings in the event of current overload. This is important in a single-phase capacitor motor for the heating rate of the auxiliary or start winding is high and it is this winding that limits the initial time that the motor may be left on the line while the rotor is locked. Protection is provided for both abnormal running conditions and for stalled or locked rotor.

It will be understood by those skilled in the art that the present invention is not limited to use in single-phase motors, but can be used in polyphase motors. For example, in a three-phase motor, one strap and protector may be provided for each phase.

By the present invention there has been provided a refrigerant compressor including an electric motor having improved protector means which can be replaced in a simple and expedient fashion.

While I have shown a preferred embodiment of the present invention, it will be understood by those skilled in the art that the invention is not so limited, since it may be otherwise embodied within the scope of the following claims.

I claim:

1. In a hermetically-enclosed single phase induction motor adapted to be connected to a source of current, said motor including a stator and a rotor inductively related thereto, the combination of a main winding, a start winding, and means for protecting the motor from adverse conditions of temperature or current, said protecting means comprising a heat conductive strap disposed in a stator winding, said conductive strap being electrically connected to said stator winding, and a thermostat having an electrically conductive casing detachably secured to the conductive strap and being in current conducting relationship thereto, said thermostat having a single terminal extending therefrom and connected to said source of current.

2. In combination with an electric motor for use in a hermetic refrigerant compressor having a sealed casing, said motor having a stator and a rotor inductively related thereto, said stator comprising a main winding and an auxiliary winding, means for protecting said motor against excessive temperature or current comprising a heat and electrically conductive strap disposed in heat exchange relationship with the main winding and auxiliary winding and electrically connected to said windings, said strap having pocket means, and a motor protector comprising an electrically conductive casing retained in said pocket means, a normally-closed bimetallic switch and a single lead adapted to be connected to a source of power, said motor protector being detachably connected to said strap so that it can be removed from the strap for replacement without interrupting the motor windings.

3. In combination with an electric motor having a winding and means for starting the motor, motor protection means comprising a conductive temperature responsive switch member in heat exchange relationship with and electrically connected to said winding, said conductive member having a pocket therein, and a protector detachably inserted in said pocket thereby making electrical contact with said conductive member, said protector having an electrically-conductive casing and a single lead extending therefrom, whereby the protector is electrically connected to said conductive member and can be removed from the conductive member for replacement without interrupting the windings.

References Cited in the file of this patent

UNITED STATES PATENTS

| | | |
|---|---|---|
| 2,471,840 | Seely | May 31, 1949 |
| 2,682,005 | Hemphill et al. | June 22, 1954 |
| 2,874,344 | Slocum | Feb. 17, 1959 |
| 2,930,959 | Slocum | Mar. 29, 1960 |
| 2,967,269 | Vaughan | Jan. 3, 1961 |